United States Patent
Callahan et al.

(10) Patent No.: US 6,341,174 B1
(45) Date of Patent: Jan. 22, 2002

(54) SELECTIVE RENDERING METHOD AND SYSTEM FOR RAPID 3 DIMENSIONAL IMAGING

(75) Inventors: Terrance Callahan, Aurora; Aaron B. Boxer, Toronto, both of (CA)

(73) Assignee: Dicomit Dicom Information Technologies Corp., Markham (CA)

( * ) Notice: Subject to any disclaimer, the term of this patent is extended or adjusted under 35 U.S.C. 154(b) by 0 days.

(21) Appl. No.: 09/266,896

(22) Filed: Mar. 12, 1999

(51) Int. Cl.[7] ................................................. G06K 9/62
(52) U.S. Cl. ................................... 382/154; 128/660.07
(58) Field of Search ................................. 382/128, 131, 382/154; 128/922, 660.07; 600/437, 443; 378/4, 21, 25

(56) References Cited

U.S. PATENT DOCUMENTS

| | | | |
|---|---|---|---|
| 5,453,371 A | * 9/1995 | Shibano et al. | 435/220 |
| 5,454,371 A | * 10/1995 | Fenster et al. | 128/660.07 |
| 5,562,095 A | 10/1996 | Downey et al. | |
| 6,101,408 A | * 8/2000 | Craine et al. | 600/425 |

* cited by examiner

Primary Examiner—Andrew W. Johns
Assistant Examiner—Seyed Azarian
(74) Attorney, Agent, or Firm—Ridout & Maybee

(57) ABSTRACT

A method and system for selectively rendering a two dimensional view of a three dimensional image, in order to facilitate rapid three dimensional imaging in a realtime or static context. Specifically, the system includes means for identifying display coordinates that continue to show the same image coordinates from view to view, and bypasses rasterization for the next view for such display coordinates, thereby reducing the access to memory required in order to retrieve image data, as well as data processing time, all required to generate new two dimensional views of a three dimensional image.

14 Claims, 2 Drawing Sheets

CODE LOGIC

1. Loop through all points pScrn on the screen contained in the given face

1a. OPTIMIZATION I
If rayIntersectsWedge(pScrn) = FALSE, then ignore and continue looping.

Otherwise:

2. transform screen point to vector in data coordinates; this point marks the beginning of the ray
3. calculate intersection points rayBegin and rayEnd, where ray intersects WEDGE_DATA OPTIMIZATION II
4. If a given point on the ray is between rayBegin and rayEnd, then apply the rendering algorithm to this point; otherwise, ignore.

5. display the result of the rendering algorithm at the point pScrn

Note: OPTIMIZATION II may not apply for all rendering algorithms. It does apply to Maximum Intensity Projection (MIP).

FIG. 2

SELECTIVE RENDERING METHOD AND SYSTEM FOR RAPID 3 DIMENSIONAL IMAGING

FIELD OF THE INVENTION

The present invention relates generally to computer-generated images, and more particularly to a method and system for rapidly rendering successive views in a series of views of a three dimensional image.

BACKGROUND OF THE INVENTION

Computer-generated images are used in many different industries to model surfaces and solids. In the medical fields, computer imaging is used in combination with ultrasound imaging, magnetic resonance imaging or other medical imaging technology to display, analyze and organize the data these medical imaging technologies provide. For example, ultrasound machines use ultrasonic wave, i.e. sonar, to scan a patient's body. The data thus obtained is then analyzed by physicians to assist the physicians in their diagnosis and treatment of patients. Ultrasound can be used to view a fetus, blood-flow patterns in arteries, or to scan organs for irregularities such as cysts, etc.

Typically, a three dimensional image is displayed to a user by being projected on a two dimensional surface such as a screen. Again, the three dimensional image is typically viewed by a user through a series of two dimensional Views to create a three dimensional image. As each view is followed by the next view on the monitor, the display coordinates of the monitor are updated to display new image properties, which, in the aggregate, display the new two dimensional view.

This new two dimensional view may be the result of changes in a dynamic image data set, such as when the view is being generated in realtime, while the data is being captured. Alternatively, the data set may be dynamic due to being downloaded from another source. Where the data set is static, such as when image data that has previously been acquired is being viewed, new views can be selected by geometrically manipulating coordinate space on which the static data set is mapped.

In realtime three dimensional rendering, the data set being rendered is a dynamic entity that changes with time as the data set is being acquired. For example, capturing a monochrome ultrasound CINE clipped with 150 frames, of typical dimension 640 by 480, the frame capture rate being 30 frames per second, requires an amount of memory equal to 150 by 640 by 480 bytes to be reserved. These bytes are filled with a single frame of data every one thirtieth of a second, until all 150 frames have been filled, which will take 5 seconds given a frame capture rate of 30 frames per second.

In realtime three dimensional imaging, a static view of the data set is typically selected, and then updated as data is added to the data set. Various rendering techniques can be used such as three dimensional texture mapping, maximum intensity projection, opacity rendering or surface rendering As data is added to the data set, and is subsequently mapped to the coordinate space, some of this new data will be projected onto the monitor. This will require the display coordinates on which this new data is projected to be rendered.

Rendering requires the data processor to access memory in order to obtain the necessary image data from the data set. Obtaining information from memory represents a bottleneck in processing time, as the processors must wait for the information to be obtained from memory. Accordingly, rasterizing is both computationally intensive and comparatively time-consuming.

These problems may also be present where the data set is a static entity, and it is the view that is dynamic. Specifically, whenever the view is changed, it will be necessary to access memory in order to retrieve the image data required to rasterize the display coordinates of the monitor in order to be able to display the new view.

Accordingly, there is a need for a system and method of reducing the computation, as well as the access to memory, required to replace existing two dimensional views shown on a monitor, with now two dimensional views of the three dimensional data set.

BRIEF SUMMARY OF THE INVENTION

An object of one aspect of the present invention is to provide a method and system for selective rendering and rapid three dimensional imaging.

In accordance with one aspect of the present invention, there is provided a method for updating a display from an $n^{th}$ view of a series of views of a three dimensional image to an $(n+1)^{th}$ view of the series of views of the three dimensional image. The three dimensional is generated in an image coordinate set of a coordinate space, and each image coordinate in the image coordinate set has an associated image property. The image coordinate set includes, for the $n^{th}$ view of the series of views, an associated $n^{th}$ image coordinate subset.

The display has a display coordinate set. The display coordinate set has for the $n^{th}$ view of the series of views, an associated $n^{th}$ display coordinate subset. The $n^{th}$ view of the series of views is generated by projecting the associated $n^{th}$ image coordinate subset onto the $n^{th}$ display coordinate subset on the display so that each display coordinate in the $n^{th}$ display coordinate subset has an associated $n^{th}$ view-specific image coordinate projected thereon. The $(n+1)^{th}$ view of the series of views is generated by projecting the associated $(n+1)^{th}$ image coordinate subset onto the $(n+1)^{th}$ display coordinate subset on the display so that each display coordinate in the $(n+1)^{th}$ display coordinate subset has an associated $(n+1)^{th}$ view-specific image coordinate projected thereon.

The method includes the following steps:
(1) for each display coordinate in both the $n^{th}$ display coordinate subset and the $(n+1)^{th}$ display coordinate subset,
  (a) determining whether the $n^{th}$ view-specific image coordinate is the same as the $(n+1)^{th}$ view-specific image coordinate; and,
  (b) when the $n^{th}$ view-specific image coordinate is the same as the $(n+1)^{th}$ view-specific image coordinate, retaining the projection of the $n^{th}$ view-specific image coordinate onto such display coordinate as the projection of the $(n+1)^{th}$ view-specific image coordinate onto such display coordinate; and,
  (b) when the $n^{th}$ view associated image coordinate is different from the $(n+1)^{th}$ view associated image coordinate, projecting the $(n+1)^{th}$ view associated image coordinate onto such display coordinate.

Preferably, the method comprises adding an additional image coordinate subset to the image coordinate set in an incremental time between the display of the $n^{th}$ view of the series of views and the $(n+1)^{th}$ view of the series of views of the three dimensional image. The $(n+1)^{th}$ view specific subset of the image coordinate set intersects with the additional image coordinate subset. Preferably, the three dimensional image is being generated in real time by scanning an imaged object. Alternatively, the image coordinate set is fixed and the $(n+1)^{th}$ view of the series of views is generated by selecting the $(n+1)^{th}$ view-specific subset of the image coordinate set.

In accordance with another preferred aspect of the invention, there is provided a method of updating a display from a preceding view in two successive views in a series of views of a three dimensional image to a subsequent view in the two successive views in the series of views of the three dimensional image. The three dimensional image is generated in an image coordinate set of a coordinate space. Each image coordinate in the image coordinate set has an associated image property.

The display includes a display coordinate set and the preceding view is generated by a preceding projection of a preceding view image coordinate subset of the image coordinate set onto a preceding view display coordinate subset of the display coordinate set so that each display coordinate in the preceding view image coordinate subset has an associated preceding view image coordinate in the preceding view image coordinate subset projected thereon. The subsequent view is generated by a subsequent projection of a subsequent view image coordinate subset of the image coordinate set onto a subsequent view display coordinate subset of the display coordinate set so that each display coordinate in the subsequent view image coordinate subset has an associated subsequent view image coordinate in the subsequent view image coordinate subset projected thereon.

The method includes the following steps:
(1) for each display coordinate in both the preceding view display coordinate subset and the subsequent view display coordinate subset,
    (a) determining whether the associated preceding view image coordinate is the associated subsequent view image coordinate;
    (b) when the associated preceding view image coordinate is the associated subsequent view image coordinate, retaining the preceding projection of the associated preceding view image coordinate onto such display coordinate as the subsequent projection of the associated subsequent view image coordinate onto such display coordinate;
    (c) when the associated preceding view image coordinate is not the associated subsequent view image coordinate, stopping the preceding projection of the associated preceding view image coordinate onto such display coordinate and beginning the subsequent projection of the associated subsequent view image coordinate onto such display coordinate.

Preferably, the two successive views in the series of views of the three dimensional image are any two successive views in the series of views of the three dimensional image. Preferably, in an incremental time between the display of the preceding view and the subsequent view, the image coordinate set of the coordinate space increases as an additional image coordinate subset is added to the image coordinate set. The subsequent view subset of the image coordinate set intersects with the additional image coordinate subset.

In accordance with a preferred aspect of the above-described method, the three dimensional image is being generated in real time by scanning an imaged object. Alternatively, the image coordinate set is static and the subsequent view subset is selected from the static image coordinate set.

In accordance with a preferred embodiment of the invention, there is provided a system for updating a display from a preceding view in two successive views in a series of views of a three dimensional image to a subsequent view in the two successive views in the series of views of the three dimensional image The three dimensional image is generated in an image coordinate set of a coordinate space. Each image coordinate in the image coordinate set has an associated image property. The display has a display coordinate set and the preceding view is generated by a preceding projection of a preceding view image coordinate subset of the image coordinate set onto a preceding view display coordinate subset of the display coordinate set so that each display coordinate in the preceding view image coordinate subset has an associated preceding view image coordinate in the preceding view image coordinate subset projected thereon. The subsequent view is generated by a subsequent projection of a subsequent view image coordinate subset of the image coordinate set onto a subsequent view display coordinate subset of the display coordinate set so that each display coordinate in the subsequent view image coordinate subset has an associated subsequent view image coordinate in the subsequent view image coordinate subset projected thereon.

The system includes a determining means, a retaining means, and a stopping means wherein for each display coordinate in both the preceding view display coordinate subset and the subsequent view display coordinate subset,
(1) the determining means determines whether the associated preceding view image coordinate is the associated subsequent view image coordinate;
(2) when the associated preceding view image coordinate is the associated subsequent view image coordinate, the retaining means retains the preceding projection of the associated preceding view image coordinate onto such display coordinate as the subsequent projection of the associated subsequent view image coordinate onto such display coordinate;
(3) when the associated preceding view image coordinate is not the associated subsequent view image coordinate, the stopping means stops the preceding projection of the associated preceding view image coordinate onto such display coordinate and beginning the subsequent projection of the associated subsequent view image coordinate onto such display coordinate.

Preferably the two successive views in the series of views of the three dimensional image can be any two successive views in the series of views of the three dimensional image.

Preferably, the system includes a data update means for increasing the image coordinate set of the coordinate space by adding an additional image coordinate subset to the image coordinate set during an incremental time between the display of the preceding view and the subsequent view. The subsequent view subset of the image coordinate set intersects with the additional image coordinate subset. Preferably, the system comprises scanning means for generating the three dimensional image by scanning an imaged object.

BRIEF DESCRIPTION OF THE DRAWINGS

Reference will now be made, by way of example, to the accompanying drawings which show preferred aspects of the present invention, and in which.

DETAILED DESCRIPTION OF THE PREFERRED EMBODIMENTS OF THE INVENTION

Figure 1:
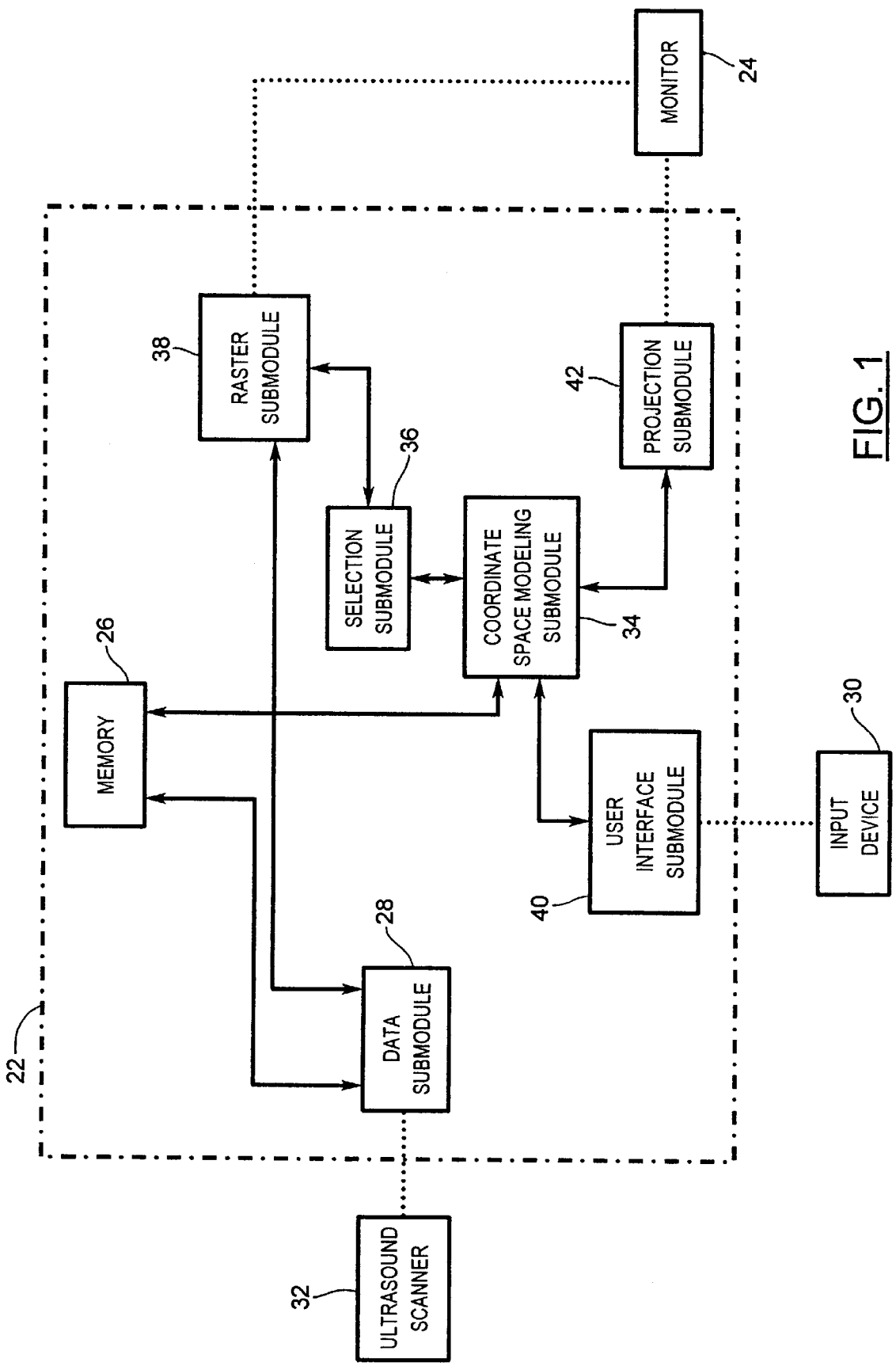
FIG. 1 is a block diagram showing a selective rendering system for rapid three dimensional imaging in accordance with an aspect of the present invention, and, FIG. 2 is a listing of the logic steps to be executed in a selective rendering method for rapid three dimensional imaging in accordance with an aspect of the present invention in which new frames of image data are being captured.

Referring to FIG. 1 there is illustrated a block diagram of a computer system 22 for analyzing computer-generated three dimensional images in accordance with a preferred embodiment of the invention. As shown in FIG. 1, the computer 22 is connected to a monitor 24 having a 640 by 480 screen, an input device 30 such as a manually operated mouse 30, and an ultrasound scanner 32.

When scanning a patient, an ultrasound operator passes a probe over a portion of the patient's body. The probe emits and receives a series of ultrasonic waves. Based on the difference between the ultrasonic waves that are emitted and those that are received, a frame of data representing a cross-sectional view of the patient's body is obtained along the path of the probe. The probes generates, say, 150 frames of data in a typical pass over the scanned portion of the patient's body. Each frame of data represents a cross-section of the part of the patient's body that is scanned using ultrasonic waves. Each frame is typically 640 by 480 pixels, but only the region of interest, which is typically about 250 by 250 pixels, is stored. Accordingly, the image data in the ultrasound scanner 32 for a single image would consist of about 150 frames, each frame being about 250 by 250 pixels.

The ultrasound scanner 32 communicates with the computer 22 and provides image data to a data submodule 28 of the imaging software on the computer 22 The data submodule 28 orders the image data in an image data array, such that each ordered image property in the image data array has associated spatial coordinates. The x and y spatial coordinates are determined by the location of the data within the 250 by 250 frame, while the z spatial coordinate is assigned to the data by the data submodule 28 based on the frame in which the data is found, In order to form three dimensional images based on the image data received from the ultrasound scanner 32, the computer 22 includes a conventional coordinate space modeling submodule 34 for generating a coordinate space. Preferably, the coordinate space takes the form of a right-angled parallelepiped, which will be referred to as modelPoly (where "poly" is an abbreviation of "polyhedron") The modelPoly is defined around the origin of a left-handed xyz coordinate system.

The coordinate space modeling submodule 34 handles all of the geometry involved in manipulating modelPoly in order to select perspectives from which to view modelPoly. These geometric transformations are more easily performed when modelPoly remains located about the origin Accordingly, modelPoly is Geometrically transformed to form a winPoly, and it is winPoly that is projected on the screen of the monitor 24 that the user sees.

The two dimensional views of winPoly shown on the screen of the monitor 24 can be rendered using a number of different approaches. In the case of three dimensional texture mapping, a surface of winPoly can be generated by slicing through winPoly at a defined location and orientation to provide the desired cross-sectional view. A selected surface can also be viewed by displaying the intersection of a series of parallel rays at a specified orientation with a predefined surface that can be defined by means of an equation. Alternatively, maximum intensity projection (MIP) can be used to render a two dimensional view of winPoly by taking the intersection of a series of parallel rays of a selected orientation with the pixel of maximum intensity that lies in the path of such ray. Other well known rendering techniques include opacity rendering and surface rendering.

The selected surface of winPoly is projected to a two dimensional image by lines that connect adjacent coordinates. The two-dimensional projection of winPoly is then sent to a raster submodule 38 (FIG. 1). The raster submodule 38 maps image data onto the two dimensional image of each visible face of winPoly, by, for each ordered image property of the image data array that has associated coordinates on a visible surface, mapping such ordered image property onto such associated coordinates. First, the projected face is broken up into contiguous, 2 dimensional triangles. Next, each triangle is filled by first identifying the minimum y value and the maximum y value that lie in the triangle. Then, for these two points, and for each y value falling between these two points, a line segment is determined. One end of this line segment is a point having the smallest x integer value falling inside the triangle, while the other end is a point having the largest x integer value falling inside the triangle. The ordered image properties having associated spatial coordinates corresponding to this line segment are then mapped onto the line segment by the raster submodule.

The projected two dimensional image of winPoly is projected onto the screen of the monitor where it can be seen by the user. Using the input device 30, the user can send commands to an user interface submodule 40, where these commands are interpreted and transmitted to a coordinate space modeling submodule 34. Examples of possible commands include the command to rotate, translate or scale winPoly. All of these commands, will result in a new view being displayed on the screen of the monitor 24.

Moving from view to view within the series of views provided on the monitor 24 may also occur as a result of new data being communicated to the data submodule 28. Specifically, consider the case in which a sonographer is scanning an object of interest such as a patient's forearm. When the sonographer begins the scan, the data submodule 28 will not include very much image data regarding the patient's forearm. This paucity of information will be reflected in the monitor 24, where only a small portion of the forearm being scanned will be shown. Say that the view selected of The forearm is an oblique view relative to the plane of the scan. Accordingly, as new data is obtained by the ultrasound scanner 32 and is sent to the data submodule 28, the three dimensional image of the forearm modeled in the coordinate space modeling submodule 34 will grow, and the new image coordinates generated by the new image data will replace, in some instances, image data that had previously been acquired by the ultrasound scanner, in the sense that this new image data will be displayed on the monitor 24 and will cover some of the image data that had previously been shown on the monitor 24.

Depending on the view selected, a view may change only slightly from the immediately preceding view. For example, where the view selected is a texture mapping, showing both a plane parallel to the direction of the scan (i.e. a plane that corresponds to a single frame of data captured by the ultrasound scanner 32), and a plane that is perpendicular to the direction of the scan, the parallel surface shown in the monitor 24 will change from view to view, in that different image coordinates arc being projected on the display coordinates of the monitor 24, and being texture mapped by the raster submodule 38 using newly available data from the data submodule 28. The portion of the previous view that was on a plane parallel to the direction of the scan will be "covered" by the new data, in that the new data will be mapped to coordinates that form a new surface above the previously viewed surface. On the other hand, all of the image coordinates corresponding to the planar surface that is perpendicular to the direction of the scan, will be retained. This plane will simply increase in length, as additional image data is added.

Similarly, where a maximum intensity projection rendering method is used, whenever new image data becomes available, this data will be compared with the previously available image data. Only where the newly acquired image data has the maximum intensity along the particular selected rays, will the new acquired image data replace the old image data previously projected onto the monitor.

The fact that from view to view many of the display coordinates of the monitor continue to show the same image coordinates provides an opportunity to reduce the data processing required to render a new view of the data set. This is particularly true, where, as with realtime rendering of a static view of a dynamic image data set representing a three dimensional image, it is the data set that is changing. In such cases, many of the display coordinates will continue to display the same image coordinates through a sequence of different views.

Specifically, using previous rendering techniques, once new data is acquired, all of winPoly is rendered. In the present invention, after each new frame of data is captured, only the small region in winPoly that is affected by the new data is rendered. The rest of winPoly has already been rendered, is unaffected by the new data, and need not be rendered again.

In order to provide this feature, the computer 22 includes a selection submodule 36. Whenever new data is acquired, and the view of winPoly shown on the monitor 24 changes, the selection submodule 36 considers each of the display coordinates. Where such display coordinate continues to show the same winPoly coordinate or image coordinate, the selection submodule 36 will bypass the raster submodule 38 with respect to such display coordinate and the projection submodule 42 will continue to project the image coordinate onto such display coordinate. On the other hand, if the selection submodule 36 determines that the display coordinate now shows a new winPoly coordinate or image coordinate, then the raster submodule 38 will not be bypassed; instead, such display coordinate will again be rasterized.

Referring to FIG. 2, a code logic listing shows the steps of a selective rendering method for rapid three dimensional imaging in accordance with the preferred aspect of the invention where new frames of image data are continually being added. This method is preferably implemented using the above-described selective rendering system.

When scanning a patient, an ultrasound operator generates a sequence of frames of image data by passing a probe over part of a patient. As discussed above, each stored frame consists of about 250 by 250 pixels, and the ordering of the image data can be represented spatially using spatial coordinates. The corresponding X and Y spatial coordinates are determined by the location of the data within this 250 by 250 frame. The Z spatial coordinate is assigned to the data based on the frame in which the data is located.

During the scan, the image data is periodically increased by a new frame being added. This additional frame is designated as a Z frame, because all of the data coordinates in this frame are assigned a common Z coordinate reflecting the fact that they all lie in a common frame.

In realtime three dimensional rendering, a view of winPoly is typically being shown on the monitor when the new image data is received. The case of texture mapping was discussed above in connection with the system of FIG. 1. The logic code of FIG. 2 relates to volume rendering, rather than surface rendering, and a 3-tuple ray, rayWin, is used for rendering.

For each point pWin in the view of winPoly, raywin extends in the direction (0,0,1) from pWin. In other words, rayWin extends parallel to the normal of the screen. The point pWin in the view of winPoly corresponds to a point pData in the image data. Due to the correspondence between the image data and winPoly (the image data has a one-to-one mapping onto the coordinates of modelPoly, which is geometrically manipulated to yield winPoly), rayWin corresponds to a 3-tuple directed line segment rayData, which begins at the point pData.

Volume rendering involves moving along rayData in steps of a fixed increment, and choosing all points on the ray that are spaced apart by this fixed increment. Based on the image data, a final intensity is determined and is then displayed at the point pWin on the monitor. The nature of the determination performed will depend on the type of rendering. In the case of maximum intensity projection, this will involve determining which point along the ray is of maximum intensity, and displaying this maximum intensity.

The first optimization step involves determining whether or not rayData passes through the new Z frame at all. In other words, it involves, for each point pWin on the surface being displayed on the monitor, determining whether a ray passing through such point also passes through the new Z frame (called WEDGE_DATA in FIG. 2).

The intersection of the new Z frame and rayData can readily be determined as the equation of both rayData and the new Z frame are known. This optimization step is performed by the function rayintersectsWedge( ), which accepts as an argument the points on the screen, and which is true when the ray from such point intersects the new Z frame, and is otherwise false. If this function yields the result false, then no new rendering need be provided along such ray. On the other hand, if this function yields the answer true, it is still possible to limit the amount of rendering required using the second optimization step.

If rayData does intersect the new Z frame, then an intersection segment of rayData is determined with end points rayBegin and rayEnd. Then, only the points that lie on rayData between rayBegin and rayEnd need be rendered, the remainder of the points on rayData can be ignored.

It will be apparent that the present invention may be implemented in other specific forms without departing from the spirit or central characteristics thereof. In particular, while the invention has been described in the context of medical co-imaging generally, and ultrasound imaging in particular, it will be apparent to those skilled in the art that the invention is applicable in other imaging contexts as well. The presently discussed embodiments are considered to be illustrative and not restrictive, the scope of the invention being indicated by the appended claims rather than the foregoing description, and all changes that come within the meaning and range of the claims are therefore intended to be embraced.

What is claimed is:

1. A method for updating a display from an $n^{th}$ view of a series of views of a three dimensional image to an $(n+1)^{th}$ view of the series of views of the three dimensional image, the three dimensional image being generated in an image coordinate set of a coordinate space, each image coordinate in the image coordinate set having an associated image property, and the image coordinate set including, for the $n^{th}$ view of the series of views, an associated $n^{th}$ image coordinate subset;

the display having a display coordinate set, the display coordinate set having, for the $n^{th}$ view of the series of views, an associated $n^{th}$ display coordinate subset, and the $n^{th}$ view of the series of views being generated by projecting the associated $n^{th}$ image coordinate subset onto the $n^{th}$ display coordinate subset on the display so that each display coordinate in the $n^{th}$ display coordinate subset has an associated $n^{th}$ view-specific image coordinate projected thereon;

the $(n+1)^{th}$ view of the series of views being generated by projecting the associated $(n+1)^{th}$ image coordinate subset onto the $(n+1)^{th}$ display coordinate subset on the display so that each display coordinate in the $(n+1)^{th}$ display coordinate subset has an associated $(n+1)^{th}$ view-specific image coordinate projected thereon;

the method comprising for each display coordinate in both the $n^{th}$ display coordinate subset and the $(n+1)^{th}$ display coordinate subset, determining whether the $n^{th}$ view-specific image coordinate is the same as the $(n+1)^{th}$ view-specific image coordinate; and, when the $n^{th}$ view-specific image coordinate is the same as the $(n+1)^{th}$ view-specific image coordinate, retaining the projection of the $n^{th}$ view-specific image coordinate onto such display coordinate as the projection of the $(n+1)^{th}$ view-specific image coordinate onto such display coordinate; and, when the $n^{th}$ view associated image coordinate is different from the $(n+1)^{th}$ view associated image coordinate, projecting the $(n+1)^{th}$ view associated image coordinate onto such display coordinate.

2. The method as defined in claim 1 wherein;

in an incremental time between the display of the $n^{th}$ view of the series of views and the $(n+1)^{th}$ view of the series of views of the three dimensional image, the image coordinate set of the coordinate space increases as an additional image coordinate subset is added to the image coordinate set; and the $(n+1)^{th}$ view specific subset of the image coordinate set intersects with the additional image coordinate subset.

3. The method as defined in claim 2 wherein the three dimensional image is being generated in real time by scanning an imaged object.

4. The method as defined in claim 1 wherein the image coordinate set is fixed and the $(n+1)^{th}$ view of the series of views is generated by selecting the $(n+1)^{th}$ view-specific subset of the image coordinate set.

5. A method of updating a display from a preceding view in two successive views in a series of views of a three dimensional image to a subsequent view in the two successive views in the series of views of the three dimensional image, the three dimensional image being generated in an image coordinate set of a coordinate space, each image coordinate in the image coordinate set having an associated image property;

the display having a display coordinate set;

the preceding view being generated by a preceding projection of a preceding view image coordinate subset of the image coordinate set onto a preceding view display coordinate subset of the display coordinate set so that each display coordinate in the preceding view image coordinate subset has an associated preceding view image coordinate in the preceding view image coordinate subset projected thereon;

the subsequent view being generated by a subsequent projection of a subsequent view image coordinate subset of the image coordinate set onto a subsequent view display coordinate subset of the display coordinate set so that each display coordinate in the subsequent view image coordinate subset has an associated subsequent view image coordinate in the subsequent view image coordinate subset projected thereon, the method comprising for each display coordinate in both the preceding view display coordinate subset and the subsequent view display coordinate subset, determining whether the associated preceding view image coordinate is the associated subsequent view image coordinate;

when the associated preceding view image coordinate is the associated subsequent view image coordinate, retaining the preceding projection of the associated preceding view image coordinate onto such display coordinate as the subsequent projection of the associated subsequent view image coordinate onto such display coordinate;

when the associated preceding view image coordinate is not the associated subsequent view image coordinate, stopping the preceding projection of the associated preceding view image coordinate onto such display coordinate and beginning the subsequent projection of the associated subsequent view image coordinate onto such display coordinate.

6. The method as defined in claim 5 wherein the two successive views in the series of views of the three dimensional image are any two successive views in the series of views of the three dimensional image.

7. The method as defined in claim 5 wherein in an incremental time between the display of the preceding view and the subsequent view, the image coordinate set of the coordinate space increases as an additional image coordinate subset is added to the image coordinate set; and the subsequent view subset of the image coordinate set intersects with the additional image coordinate subset.

8. The method as defined in claim 7 wherein the three dimensional image is being generated in real time by scanning an imaged object.

9. The method as defined in claim 5 wherein the image coordinate set is static and the subsequent view subset is selected from the static image coordinate set.

10. A system for updating a display from a preceding view in two successive views in a series of views of a three dimensional image to a subsequent view in the two successive views in the series of views of the three dimensional image, the three dimensional image being generated in an image coordinate set of a coordinate space, each image coordinate in the image coordinate set having an associated image property;

the display having a display coordinate set;

the preceding view being generated by a preceding projection of a preceding view image coordinate subset of the image coordinate set onto a preceding view display coordinate subset of the display coordinate set so that each display coordinate in the preceding view image coordinate subset has an associated preceding view image coordinate in the preceding view image coordinate subset projected thereon;

the subsequent view being generated by a subsequent projection of a subsequent view image coordinate subset of the image coordinate set onto a subsequent view display coordinate subset of the display coordinate set so that each display coordinate in the subsequent view image coordinate subset has an associated subsequent view image coordinate in the subsequent view image coordinate subset projected thereon;

the system comprising a determining means, a retaining means and a stopping means wherein for each display coordinate in both the preceding view display coordinate subset and the subsequent view display coordinate subset, said determining means determines whether the associated preceding view image coordinate is the associated subsequent view image coordinate;

when the associated preceding view image coordinate is the associated subsequent view image coordinate, said retaining means retains the preceding projection of the associated preceding view image coordinate onto such display coordinate as the subsequent projection of the associated subsequent view image coordinate onto such display coordinate;

when the associated preceding view image coordinate is not the associated subsequent view image coordinate, said stopping means stops the preceding projection of the associated preceding view image coordinate onto such display coordinate and beginning the subsequent projection of the associated subsequent view image coordinate onto such display coordinate.

11. The system as defined in claim 10 wherein the two successive views in the series of views of the three dimensional image are any two successive views in the series of views of the three dimensional image.

12. The system as defined in claim 10 wherein in an incremental time between the display of the preceding view and the subsequent view, a data update means for increasing the image coordinate set of the coordinate space by adding an additional image coordinate subset to the image coordinate set; and the subsequent view subset of the image coordinate set intersects with the additional image coordinate subset.

13. The system as defined in claim 12 further comprising scanning means for generating the three dimensional image by scanning an imaged object.

14. The system as defined in claim 10 wherein the image coordinate set is static and the subsequent view subset is selected from the static image coordinate set.

* * * * *